June 22, 1965  W. T. MADEIRA  3,190,006
BRAKE DRUM GAUGE
Filed April 30, 1962  2 Sheets-Sheet 2
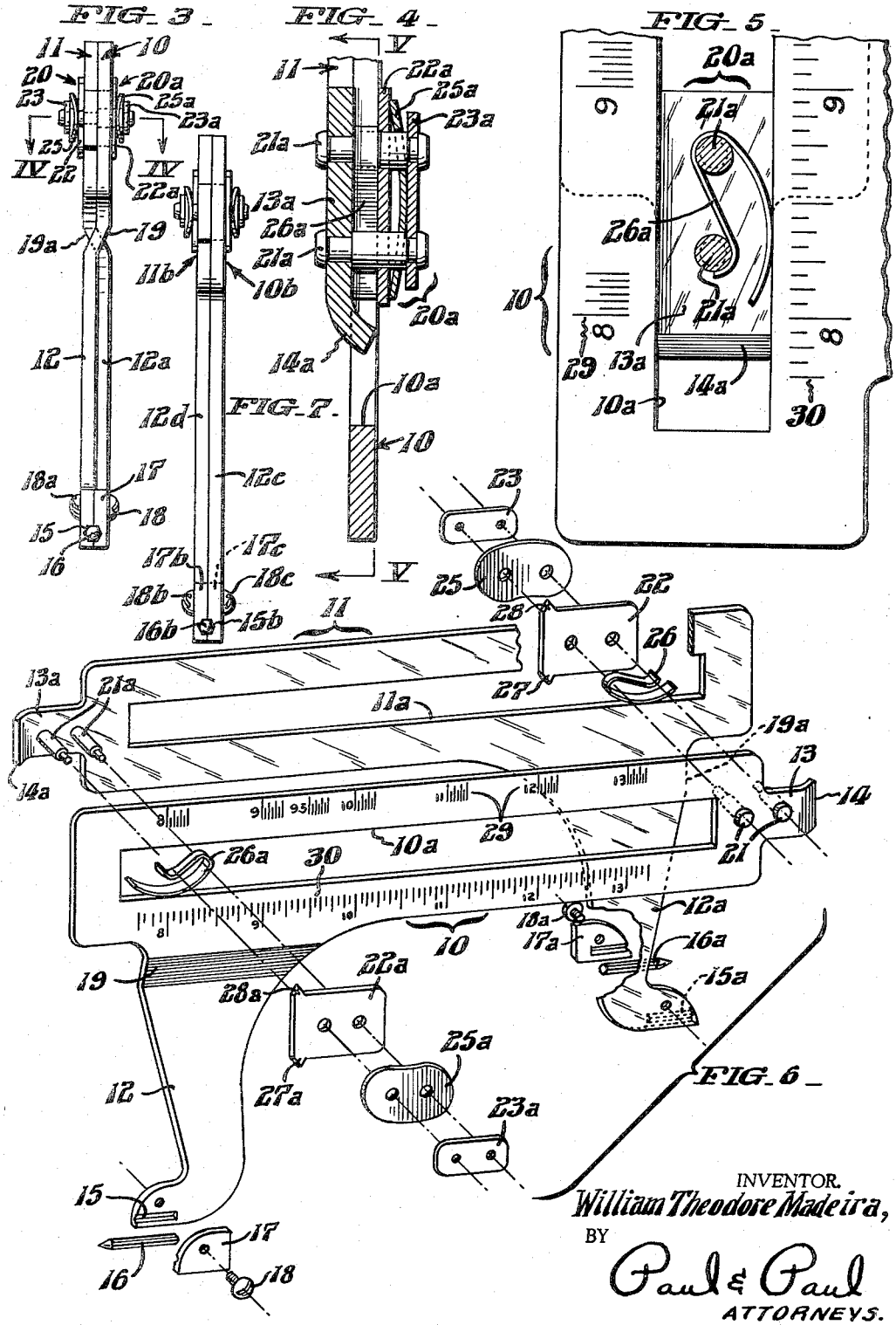
INVENTOR.
William Theodore Madeira,
BY
Paul & Paul
ATTORNEYS.

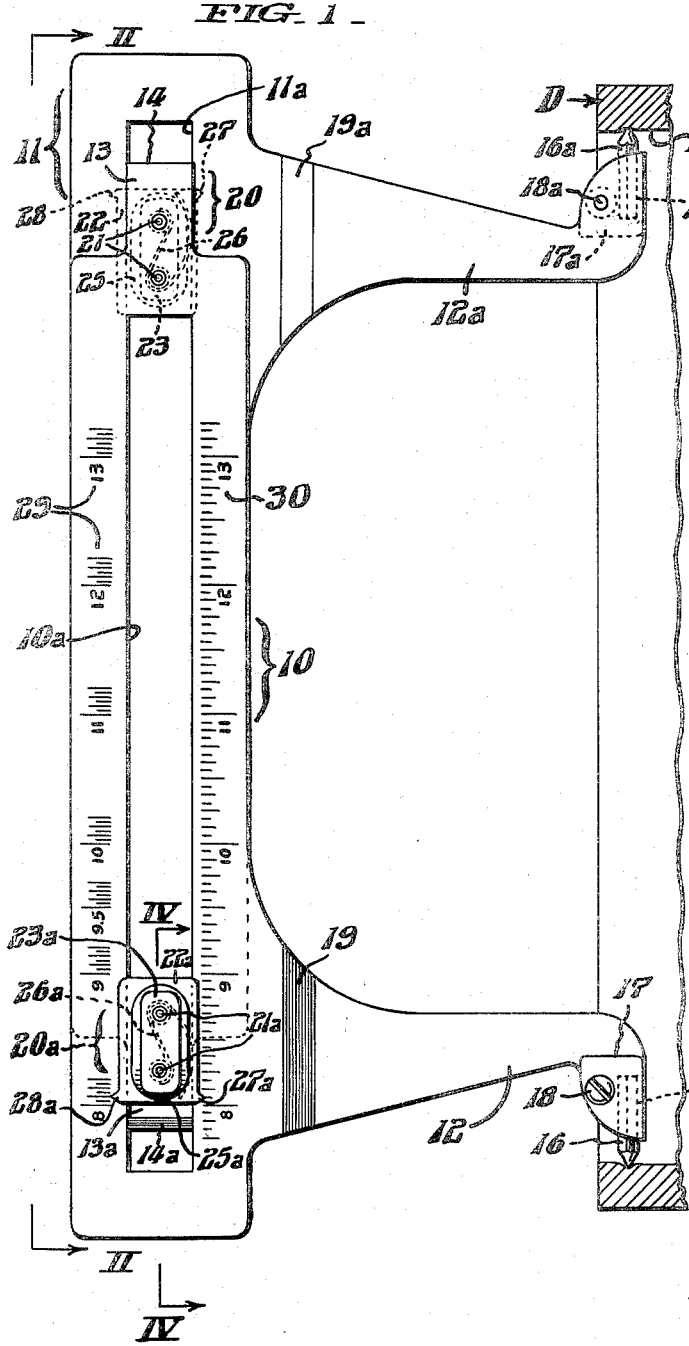

3,190,006
BRAKE DRUM GAUGE
William T. Madeira, Lancaster, Pa., assignor to K-D Manufacturing Company, Lancaster, Pa., a corporation of Pennsylvania
Filed Apr. 30, 1962, Ser. No. 199,860
6 Claims. (Cl. 33—143)

This invention relates to a gauge and particularly to a gauging device for measuring the brake drums of automotive vehicles or the like for wear, and for determining if re-machining of such brake drums is feasible within prescribed safety limits.

My invention has for its chief aim the provision of a gauge for the stated purpose which is simple and compact in construction; which is easily and quickly applied to and removed from brake drums to be tested; which is easily read and is reliable as to the accuracy of its readings; which is universally adaptable in gauging brake drums of all nominal sizes including those of both domestic and foreign manufacture; which is rugged for capacity to withstand rough handling; and which, withal, lends itself readily to production in quantity at small cost.

Other objects and attendant advantages will appear from the following detailed description of the attached drawings, wherein:

FIG. 1 is a view in side elevation showing the gauge of my invention in one form as applied to an 8″ brake drum;

FIG. 2 is an elevation of the gauge as it appears when viewed in the direction of the angled arrows II—II in FIG. 1;

FIG. 3 is an end elevation of the gauge as it appears when viewed in the direction of the arrows III—III in FIG. 2;

FIG. 4 is a fragmentary view in cross section taken as indicated by the angled arrows IV—IV in FIGS. 1 and 3;

FIG. 5 is a fragmentary view in section taken as indicated by the angled arrows V—V in FIG. 4;

FIG. 6 is an exploded view in perspective with the component parts of the device detached from one another; and FIG. 7 is a view in end elevation similar to FIG. 3 showing an alternative embodiment of my invention.

In the form exemplified in FIGS. 1–6 of these illustrations, the brake drum gauge of my invention comprises two counterpart reversely-arranged flat elongated main components 10 and 11 which are fashioned from suitably stiff plate material, and which are aligned in lengthwise slidable relationship to each other. These main components are longitudinally slotted at 10a and 11a, and respectively have lateral arms 12, 12a and narrow tongue prolongations 13, 13a at opposite ends of the slotted portions, said tongues being bent laterally and inwardly as at 14 and 14a. It will be noted that in the assembled gauge, the laterally-directed end portion 14 of the tongue 13 of the component 10 engages the slot 11a of the component 11, and that the laterally-directed end portion 14a of the tongue 13a of the component 11 engages the slot 10a of the component 10.

The distal ends of the arms 12, 12a respectively of the components 10 and 11 are provided with transverse shoulder-ended grooves 15 and 15a (FIGS. 3 and 6) for lodgment therein of replaceable pins 16 and 16a, which are held in place by counter-grooved clamp plates 17 and 17a secured to said arms by headed screws 18 and 18a. The pins 16 and 16a are pointed to engage the internal surface of a brake drum D at diametrically opposite positions after the manner shown in FIG. 1. Due to offsetting of the arms at 19 and 19a in FIGS. 1 and 3 the pins 16, 16a are disposed in the longitudinal plane of the contact of the two main components thereby providing a high degree of accuracy over the entire range of measurements.

For maintaining the components 10 and 11 assembled and in frictional sliding engagement with each other, I have provided duplicate means generally designated 20 and 20a in FIGS. 1 and 2 which, respectively, are associated with said main components 10 and 11 at the tongue prolongations 13 and 13a thereof. The means 20a (see FIGS. 3–5) includes a pair of spaced studs 21a which are anchored in the tongue prolongation 13a of the component 11 and extend through the longitudinal slot 10a of the component 10. Loosely engaged upon the protruding ends of the studs 21a is a perforated friction plate 22a which is adapted to bear upon the exposed face of the component 10; and interposed between said friction plate 22a and a perforated backing plate 23a affixed at the distal ends of the studs, is a perforated bow spring 25a. In addition, there is a finger spring 26a which is anchored about the studs 21a within the slot 10a of component 10, the end of said spring bearing against one edge of the slot 10a in said component 10 as best seen in FIGS. 4 and 5. The other means 20 comprises parts which are identical with those of the means 20a, and are designated respectively by the same reference numerals devoid of the exponent "a," said means 20 being associated with a component 10 at the tongue end 13 thereof with the friction plate 22 bearing against the exposed side face of the component 11 and the finger spring 28 bearing upon one of the longitudinal edges of the slot 11a in the last mentioned component. From FIGS. 1 and 6 it will be noted that the friction plate 22a of the means 20a has arrowhead projections 27a, 28a for coordination respectively with graduated scales 29 and 30 marked on the exposed face of the main component 10 above and below the longitudinal slot 10a. The scale 29 is graduated from 8 to 13 inches with subdivisions from .030 to .180 inch adjacent the respective prime numbers. The reason for this method of graduation is that "Lincoln" automobiles of 1961 and 1962, for example, have brake drums which are .060 inch over the standard inch, and according to law must not be re-machined to .120 inch. "Ford" and "Mercury" automobiles are equipped at the present time, with brake drums which are .030 inch over the standard inch, and it is permissible to re-machine them to .090 inch over size. Again, the brake drums of some of the present day trucks are .120 inch over size and under the law can be re-machined up to .180 inch over size. Thus, with the aid of my improved gauge, it is possible to test the brake drums of all standard American motor vehicles known at the present time. There are some cars of foreign manufacture of which the brake drums are in metric dimensions which must be converted into decimals in the use of the gauge. The scale 30 comprehends the stretch between 7¾ and 13¼ inches which are marked off in accordance with U.S. Standards in sixteenths. The scale 30 is intended to augment the scale 29 in the event that, in the future, some manufacturers make drums that cannot be conveniently measured by the scale 29. If desired or deemed essential, the friction plate 22 of the means 20 may be similarly provided with arrowhead projections 27 and 28 for coordination with scales on the exposed side face of the component 11 similar to the scales on the exposed face of the component 10.

In preparation for the use of the gauge to measure the internal diameter of a worn 8″ brake drum such as shown in FIG. 1, for example, it is first contracted, then inserted into the hollow of the drum, and finally extended to bring the points 16 and 16a into contact with the inner surface F of the drum at diametrically opposite spots. By reference thereupon to the scale graduations 29 on the component 10, it will be seen that the coordinating arrowheads 27a and 28a of the plate 20a indicate that the internal diameter of the drum is worn to the extent of .060 of an inch and is not in a condition favorable for re-boring or re-grinding, the limit for re-finishing for wear ordinarily being .060 inch. After the test has been made, the gauge is contracted for easy and quick removal from the drum D. In a similar manner, it is possible to test worn brake drums of standard nominal diameters up to 13" as will be readily apparent. Due to disposal of the points 16 and 16a in the plane of mutual contact of the two main components, the gauge can be depended upon for the accuracy of its readings over the entire range of measurements.

In the alternative embodiment of my invention illustrated in FIG. 7, the arms 12c and 12d respectively of the two main components 10b and 11b are not offset as in the first described embodiment. As here shown, the arm 12c of the component 12b is provided at the back face of its distal end with a transverse shouldered groove 15b for reception of a pin 16b (similar to the pins in the first described embodiment) said pin being held in place by a clamp plate 17b which is secured by a headed screw 18b. It is to be understood that the inner face of the distal end of the arm 12d of the component 11b is similarly provided with a groove for reception of a pin (not shown) held in place by a clamp plate 17c and screw 18c. It will thus be seen that in the alternative embodiment, the two pins are centered in the plane of contact between the two main components 10b and 11b as in the first described embodiment. It is to be understood further that in all other respects, the construction of the alternative embodiment of my invention illustrated in FIG. 7 is identical with the form shown in FIGS. 1–6.

While in accordance with the provisions of the statutes, I have illustrated and described the best forms of embodiment of my invention now known to me, it will be apparent to those skilled in the art that changes may be made in the form of the apparatus described without departing from the spirit and scope of the invention as set forth in the appended claims, and that in some cases certain features of my invention may be used to advantage without a corresponding use of other features.

Having thus described my invention, I claim:

1. In a brake drum gauge adapted to measure on one scale the interior diameter of a brake drum, including the depth of pin-point width grooves in the drum,
   (A) a pair of flat-surfaced, elongated, longitudinally slotted main components each having an inner face and an outer face, reversely arranged and aligned opposite each other so that the inner faces of said main components are in opposing relationship, each main component having an integrally formed laterally projecting rigid arm at one end and a tongue-like projection at the other;
   (B) said laterally projecting arms having pins at their respective distal ends, said pins having sharp conical heads and being rigidly positioned so as to be oppositely disposed in axial alignment and in a plane parallel to the slots in the main components for engaging the inner surface of a brake drum at diametrically opposite points;
   (C) indicator means affixed to the tongue-like projection of one of said main components for coordination with a graduated scale affixed to the surface and along the slot of the other main component;
   (D) and holding means for urging said main components against each other so that the mutual friction between said main components maintains said main components firmly in place with respect to each other within their range of mutual movement when no component of force is applied to either end of said components, but which further permits said main components to be slidingly moved with respect to each other merely by the application of oppositely directed force upon either end of said main components, said holding means including mounting elements affixed to the tongue-like projection of each main component and projecting through the longitudinal slot of the other main component, and friction plates affixed to said mounting elements and held in slidable engagement with the outer face of said other main component and across said slot,
   whereby the depth of pin point width grooves in a brake drum may be accurately measured by varying the distance between said pinheads by infinitely small amounts merely by sliding one main component with respect to the other main component and whereby the diameter of said brake drum from one edge of the drum to its other edge may be measured in successive pinhead width intervals in a single continuous insertion of the gauge into the brake drum.

2. A brake drum gauge characterized as in claim 1, wherein the arms of the respective main components have grooves at their distal ends for receiving the pins, and wherein correspondingly grooved clamp plates are provided to secure the respective pins in position in said grooves.

3. A brake drum gauge characterized as in claim 1, wherein a backing plate is secured to the distal ends of the mounting elements and a bow spring is interposed between said friction plate and said backing plate.

4. A brake drum gauge characterized as in claim 3, wherein the holding means on each main component further includes a finger spring which is anchored about the mounting elements and disposed within the slot of said other main component with its free end bearing upon one edge of the slot in said other main component.

5. A brake drum gauge characterized as in claim 4, wherein the friction plate associated with one main component has an indicating element thereon for coordination with the graduated scale on the exposed face of the other main component.

6. A brake drum gauge characterized as in claim 5, wherein the friction plate associated with the one main component has indicating elements thereon for coordination respectively with differently graduated scales on the exposed face of the other main component respectively along opposite sides of the slot in said other main component.

References Cited by the Examiner

UNITED STATES PATENTS

| | | | |
|---|---|---|---|
| 563,089 | 6/96 | Strange | 33—143 X |
| 673,687 | 5/01 | Penfield | 33—158 X |
| 1,001,229 | 8/11 | Stuart et al. | 33—93 X |
| 1,245,213 | 11/17 | Gammeter | 33—160 X |
| 2,499,721 | 3/50 | Cassity | 33—102 X |
| 2,668,359 | 2/54 | Litchfield | 33—158 X |
| 2,770,884 | 11/56 | Eckert et al. | 33—102 X |
| 2,791,032 | 5/57 | Barrett | 33—143 |
| 2,791,837 | 5/57 | Denslinger | 33—41 |
| 3,006,076 | 10/61 | Wisti | 33—147 X |

ISAAC LISANN, *Primary Examiner.*